July 4, 1961
W. J. S. IDE
2,990,732
HAND DRILL GAUGE AND HOLE SETTER
Filed June 24, 1959
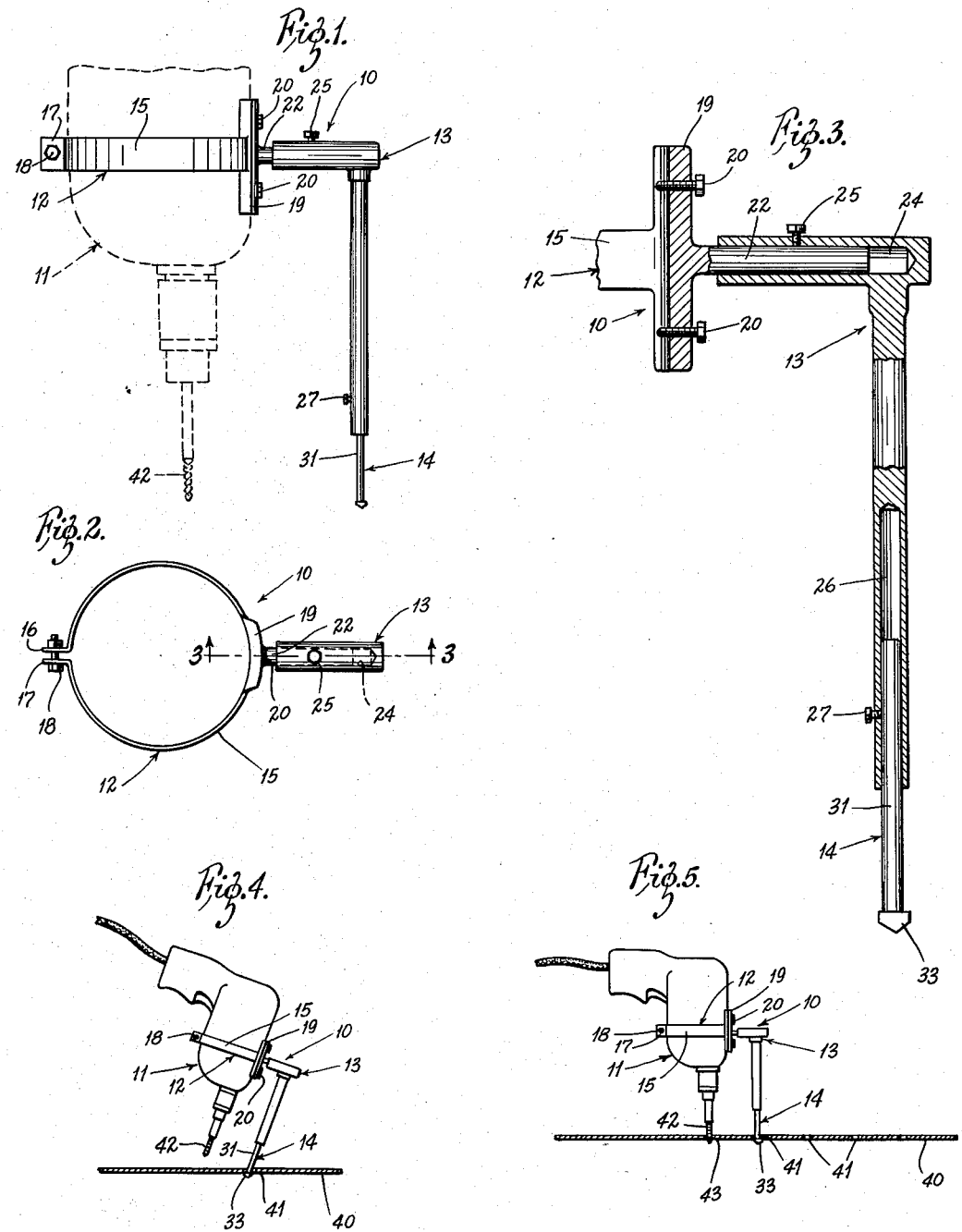
INVENTOR:
WILLIAM J. S. IDE,
By Kingsland, Rogers & Ezell
ATTORNEYS United States Patent Office 2,990,732
Patented July 4, 1961

2,990,732
HAND DRILL GAUGE AND HOLE SETTER
William J. S. Ide, 2833a McNair, St. Louis, Mo.
Filed June 24, 1959, Ser. No. 822,640
4 Claims. (Cl. 77—55)

This invention relates to improvements in hand drill gauges and in particular is concerned with a conveniently employed device that can be used with hand drills for gauging the distance between holes and for drilling the holes.

In the past it has been a problem in drilling a multiplicity of holes at regular intervals in any kind of a line, straight or curved. Such multiple hole drilling has necessitated the use of templets, measured markings and the like, all of which requires a substantial amount of time in the layout. Such multiple drilling of holes is also fatiguing and laborious.

By means of the instant invention there has been provided an attachment in the way of a clamp which readily fits upon conventional electric hand drills as well as on pneumatic and other drills. This clamp is provided with an extensible gauge in the form of an elbow, which receives a gauging element having a hooked portion at the end. The clamp may be conveniently attached to conventional hand drills by means of the adjustable features of the clamp and the elbow may be extended to varying positions to provide for drilling holes at different settings. Likewise, the gauging element which is in the form of a shaft may be raised or lowered in the elbow housing to provide for setting of holes in different gauge material or where different types of drills are employed.

As a particular feature of this invention, the gauging element, which is positioned in an axis parallel to the drill element of the hand drill, is provided with a hooked or offset portion at the lower end that functions as a catch. The lower end fits through a previously drilled hole relatively loosely therein and by virtue of the hooked portion, which bears against the underneath side of the metal being drilled, serves as a fulcrum for partial support of the hand drill to facilitate the drilling of the next hole. Also, by this support the weight of the hand drill plus any force applied on it by hand will receive the benefit of the mechanical advantage established by the fulcrum relationship so that a very substantial pressure may be exerted on the drilling tool. After the next hole is drilled the gauging element is withdrawn from the gauging hole and inserted in the drill hole just completed and the operation is repeated.

The clamp and gauging device of this invention are very simple in their construction and in operation and provide a wide range of adaptability for industrial drilling of sheet metal and like material. The device is extremely simple to use and greatly facilitates the drilling of multiple holes.

It is accordingly a primary object of this invention to provide a hand drill gauge and hole setter, which may be used with hand drills, in which a gauging element that has varying degrees of adjustability may be used to gauge a newly drilled hole from a previously drilled hole in a preselected spaced relationship.

Still another object of this invention is to provide a hand drill gauge and hole setter comprising a clamp for hand drills with a gauging element fitting in an adjustable housing therefor in which the gauging element may be set at various distances from the drill and at varying angles thereto.

Another object of this invention is to provide a hand drill gauge and hole setter, which may be conveniently attached to a hand drill, in which a gauging element in the form of a thin shaft is employed having a hooked end portion, which is adapted to fit through a previously drilled hole with the hooked portion bearing on the bottom surface of the material drilled in the next drilling operation so that the device may be used as a support to facilitate the drilling operation.

Another object of this invention is to provide a hand drill gauge and hole setter which may be simply yet ruggedly constructed of standard materials of construction and which lends itself to very simple use by relatively unskilled workmen.

Further objects of this invention will appear in the detailed description which follows and will be further apparent to those skilled in the art.

For the purpose of illustration of this invention there is shown a preferred embodiment thereof in the accompanying drawing. It is to be understood, however, that these drawings are for the purpose of example only and that the invention is not limited thereto.

In the drawings:

FIGURE 1 is a view in side elevation of a conventional hand drill shown in dotted lines with the attached hand drill gauge and hole setter of this invention;

FIGURE 2 is a top plan view of the hand drill gauge and hole setter;

FIGURE 3 is a view in enlarged section taken on the line 3—3 of FIGURE 2 showing the construction of the housing with the adjustment means and the gauging element;

FIGURE 4 is a view in side elevation of a hand drill attached with the gauge and hole setter of this invention at the begining of a drilling operation; and FIGURE 5 is a view taken similarly to FIGURE 4 but showing the drilling operation as it is completed.

The hand drill gauge and hole setter of this invention is generally indicated by the reference numeral 10 in the drawing and is shown in FIGURES 1, 4 and 5 attached to a conventional electric hand drill 11. The principal components of the hand drill gauge and hole setter comprise a clamp 12, an elbow or right angle housing 13 and a gauge element 14.

The clamp 12 is best shown in FIGURES 1, 2 and 3 as being comprised of a cylindrical band 15 having flanges 16 and 17 which are adapted to be drawn together tightly on the body of the drill by an adjustment nut and bolt 18. The front of the clamp is provided with a reinforced arcuate support or saddle 19 which extends vertically both above and below the band 15, as best shown in FIGURES 2 and 3. This provides a close hugging support upon the body of the drill and also provides a firm base for a vertically extending support shaft 22. Setscrews 20 are provided in the arcuate support to provide for adjustment upon bodies that are oddly shaped, i.e., not cylindrical.

The elbow housing 13, as best shown in FIGURE 3, is provided with a socket 24 which receives the support shaft 22 and may be rotated thereupon and adjusted in a desired position by a setscrew 25. The other end of the housing 13 is provided with a socket 26 within which the gauging element 14 is received and may be adjusted in varying positions of elevation by a setscrew 27.

The gauging element 14 is best shown in FIGURE 3 as being comprised of an elongated shaft 31 which is received within the socket 26 of the elbow housing 13 in selected positions of adjustment. The lower end depends from the shaft 31 to form a terminal hook portion 33. The hook or offset portion 33 permits the contacting of the bottom of the sheet metal or other material through the hole which has been previously drilled to provide a support of a bearing nature against which the hook portion rests to facilitate the support of the drill in the operation of drilling the next hole, and also to make possible the application of a greater hand pressure. This will more particularly appear in the description of the operation below.

Operation

The hand drill gauge and hole setter of this invention is very simply adapted to be attached to conventional hand drills. This attachment is made by loosening the clamp so that the adjustment nut and bolt 18 are unscrewed relative to one another in order that the clamp may be fitted upon the body of the drill. The nut and bolt 18 are then tightened to bring the flanges 16 and 17 together and thereby tighten the band 12 upon the body of the hand drill as shown in FIGURES 1, 4 and 5. In this position it will be noted that the support 21 snugly engages the body both above and below the circling band. Where the support 21 and the drill body do not fully mate with one another the set screws 20 are employed in an obvious fashion to bring about the proper adjustment.

In the operation of the hand drill gauge and hole setter it can be assumed that the first hole has already been drilled or, if it has not been drilled, the gauging element may be retracted into the socket 26 of the elbow housing 13 by appropriate loosening and then tightening of the nut 27 after which the drilling of the first hole may be made in conventional fashion.

With the first hole drilled the gauging element 14 is inserted into the first drilled hole in a piece of sheet metal, for example, as shown in FIGURE 4. In this figure the sheet metal is designated by the numeral 40 and the first drilled hole by the numeral 41. In this operation as shown in the sequence of FIGURES 4 and 5, the hooked portion 33 engages the side of the previously drilled hole 41 and the drill 42 of the hand drill 11 is then moved counterclockwise as viewed in the drawings and placed upon the sheet metal. The drilling is then commenced in usual fashion while the hooked end 33 of the gauging serves as an anchor. In this drilling operation, as has been previously mentioned, greater force may be brought to bear through the fulcrum relationship established. The completion of the operation is shown in FIGURE 5 in which it is noted that the newly drilled hole 43 has been completely drilled through while the hooked portion 33 of the gauging element 14 still bears against the sides of the previously drilled hole 41. Thus, the gauging elements serve both to engage or guide and also as a support and fulcrum in the drilling of the next succeeding hole from the previously drilled hole which serves as a register.

The succeeding operations of drilling are carried out in a like manner as previously described. Thus, a long line of holes may be drilled with the gauging being from the immediately preceding drilled hole. A wide degree of adaptability may be had through the attachment of this invention through drilling differently spaced holes where desired by appropriate adjustment of the setscrew 25 to position the gauging element at varying distances from the drill. Also, where desired, the gauging element 14 and the supporting housing may be rotated with respect to the drill 42 by turning the elbow housing upon the axis of the support shaft 22 through appropriate adjustment of the set screw 25. Thus, should it be desired to drill at right angles, as in corners and the like, this may be readily done in obvious fashion as will be apparent to those skilled in the art.

In use the drill gauge and hole setter may be rotated 90° from the operative position shown in FIGURE 1 and used as a handle in a conventional drilling operation. Also, as further modifications, the tool can be used in other rotary applications such as driving sheet metal screws and the like.

By means of this invention, as described above, various types of materials such as sheet metal, plywood, and other standard materials of construction may be readily drilled in a multiplicity of holes in a very simple and rapid and expeditious fashion without the usual expenditure of time and labor in such drillings. The use of the hand drill gauge and hole setter in forming a support in the drilling operations through the hooked portion 33 of the gauging element serves very efficiently in insuring that the drill does not slip and serves as a very advantageous support or anchor to prevent undue arm tiring in such multiple drilling operations, since the weight of the drill itself in combination with the anchoring action provides the major part of the force required. Also, as previously emphasized, the tool may be used much as a lever through the fulcrum relationship obtained through the hooked end of the gauging element.

Various changes and modifications may be made in the hand drill gauge and hole setter of this invention as will be readily apparent to those skilled in the art. Such changes and modifications are within the scope and teaching of this invention as defined by the claims appended hereto.

What is claimed is:

1. A drilling device for gauging the spacing between holes and facilitating their drilling, said device comprising support means for supporting a gauging element supported from the body of a hand drill provided with a drilling element, said support means comprising an elbow shaped housing provided by two arms forming said housing, means for rotatably supporting one of said arms from a body of a hand drill provided with a drilling element, said means comprising a shaft supported by and extending from the body and being rotatably receivable in a socket provided in said support arm, means for supporting a gauging element from the other arm of the housing, said gauging element being in the form of an elongated shaft adjustable in spaced parallel relation with respect to the drilling element and being insertable in a drilled hole to provide a selected spaced relation for the next drilling operation.

2. A drilling device for gauging the spacing between holes and facilitating their drilling, said device comprising support means for supporting a gauging element supported from the body of a hand drill provided with a drilling element, said support means comprising an elbow shaped housing provided by two arms forming said housing, means for rotatably supporting one of said arms from a body of a hand drill provided with a drilling element, said means comprising a shaft supported by and extending from the body and being rotatably receivable in a socket provided in said support arm, means for supporting a gauging element from the other arm of the housing, said gauging element being in the form of an elongated shaft adjustable in spaced parallel relation with respect to the drilling element and being insertable in a drilled hole to provide a selected spaced relation for the next drilling operation and said gauging element being provided with a hooked tip which is cooperable with the bottom edge of a previously drilled hole to provide a bearing support in the next drilling operation.

3. A drilling device for gauging the spacing between holes and facilitating their drilling, said device comprising support means for supporting a gauging element supported from the body of a hand drill provided with a drilling element, said support means comprising an elbow shaped housing provided by two arms forming said housing, means for rotatably supporting one of said arms from a body of a hand drill provided with a drilling element, said means comprising a shaft supported by and extending from the body and being rotatably receivable in a socket provided in said support arm, means for supporting a gauging element from the other arm of the housing, said gauging element being in the form of an elongated shaft adjustable in spaced parallel relation with respect to the drilling element and being insertable in a drilled hole to provide a selected spaced relation for the next drilling operation and said gauging element being provided wtih a hooked tip which is cooperable with the bottom edge of a previously drilled hole to provide a bearing support in the next drilling operation, and means for supporting said gauging element in varying degrees of adjustment with respect to the last named arm of the elbow shaped housing to alter its effective length.

4. A drilling device for gauging the spacing between holes and facilitating their drilling, said device comprising a circular clamp adapted to fit over the body of a hand drill provided with a drilling element, said clamp having support means for supporting a gauging element, said support means comprising an elbow shaped housing provided by two arms forming said housing, means for rotatably supporting one of said arms from the clamp, said means comprising a shaft supported by and extending from the clamp and being rotatably receivable in a socket provided in said support arm, a gauging element supported from the second arm of the housing, said gauging element being in the form of an elongated shaft adjustable in spaced parallel relation with respect to the drilling element and being insertable in a drilled hole to provide a selected spaced relation for the next drilling operation, and said gauging element being provided with a hooked tip which is cooperable with the bottom edge of a previously drilled hole to provide a bearing support in the next drilling operation.

References Cited in the file of this patent
UNITED STATES PATENTS

| | | |
|---|---|---|
| 1,231,438 | Serpas | June 26, 1917 |
| 2,709,380 | Reynolds | May 31, 1955 |